US010834037B2

(12) United States Patent
Zheng et al.

(10) Patent No.: US 10,834,037 B2
(45) Date of Patent: *Nov. 10, 2020

(54) SYSTEMS AND METHODS FOR IMAGE SHARING

(71) Applicant: Tencent Technology (Shenzhen) Company Limited, Shenzhen (CN)

(72) Inventors: Zhihao Zheng, Shenzhen (CN); Shuang Qin, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 64 days.

This patent is subject to a terminal disclaimer.

(21) Appl. No.: 16/020,299

(22) Filed: Jun. 27, 2018

(65) Prior Publication Data
US 2018/0324124 A1 Nov. 8, 2018

Related U.S. Application Data

(63) Continuation of application No. 14/742,832, filed on Jun. 18, 2015, now Pat. No. 10,038,656, which is a (Continued)

(30) Foreign Application Priority Data

Jun. 28, 2013 (CN) .......................... 2013 1 0270064

(51) Int. Cl.
H04L 12/58 (2006.01)
H04L 29/08 (2006.01)
(52) U.S. Cl.
CPC .............. H04L 51/08 (2013.01); H04L 51/32 (2013.01); H04L 67/1097 (2013.01); H04L 67/141 (2013.01)

(58) Field of Classification Search
CPC ....... H04L 51/08; H04L 51/32; H04L 67/141; H04L 67/1097; H04L 51/02; H04L 51/04; G06Q 10/10
(Continued)

(56) References Cited

U.S. PATENT DOCUMENTS 8,117,271 B2* 2/2012 McConn .............. G06Q 10/107
709/206
9,667,585 B2* 5/2017 Kucharewski .... H04M 1/27457
(Continued)

FOREIGN PATENT DOCUMENTS

CN 101123568 A 2/2008
CN 101159714 A 4/2008
(Continued)

OTHER PUBLICATIONS

Samoryadova A, Bogachev A, Shiryaev P, Kulakov K. MySocials Gallery: Application for Browsing Galleries of Images from Social Networks. (Year: 2011).*
(Continued)

Primary Examiner — John A Follansbee
Assistant Examiner — James N Fiorillo
(74) Attorney, Agent, or Firm — Anova Law Group, PLLC

(57) ABSTRACT

Systems and methods are provided for image sharing. For example, a terminal sends to a server a conversation-processing request to request to release a target conversation message from a current user of a messaging application to a conversation group; the server receives the conversation-processing request, acquires the target conversation message from the conversation-processing request, determines whether the target conversation message includes a first image; in response to the target conversation message including a first image, the server stores the first image in a
(Continued)

shared album corresponding to the conversation group and forward the target conversation message to members of the conversation group.

16 Claims, 20 Drawing Sheets

Related U.S. Application Data continuation of application No. PCT/CN2013/090823, filed on Dec. 30, 2013.

(58) Field of Classification Search
USPC .......................... 709/204, 205, 206, 227, 248
See application file for complete search history.

(56) References Cited

U.S. PATENT DOCUMENTS

| | | | | |
|---|---|---|---|---|
| 10,019,136 | B1* | 7/2018 | Ozog | H04L 51/28 |
| 2003/0149731 | A1* | 8/2003 | Ohwa | G06Q 20/04 |
| | | | | 709/206 |
| 2003/0236830 | A1* | 12/2003 | Ortiz | G06Q 10/10 |
| | | | | 709/204 |
| 2005/0021624 | A1* | 1/2005 | Herf | H04L 12/1822 |
| | | | | 709/204 |
| 2005/0060643 | A1* | 3/2005 | Glass | G06F 40/169 |
| | | | | 715/205 |
| 2006/0190537 | A1* | 8/2006 | Morris | G06Q 10/10 |
| | | | | 709/204 |
| 2007/0078846 | A1* | 4/2007 | Gulli | G06F 16/583 |
| 2007/0156434 | A1* | 7/2007 | Martin | G06F 16/51 |
| | | | | 705/1.1 |
| 2007/0239792 | A1* | 10/2007 | Chen | G06F 16/313 |
| 2008/0209075 | A1* | 8/2008 | Shamma | H04L 29/06 |
| | | | | 709/248 |
| 2009/0248692 | A1* | 10/2009 | Tsukagoshi | G06F 16/58 |
| 2011/0055309 | A1* | 3/2011 | Gibor | H04L 69/18 |
| | | | | 709/202 |
| 2011/0072098 | A1* | 3/2011 | Moudy | G06Q 20/382 |
| | | | | 709/206 |
| 2011/0246945 | A1* | 10/2011 | Caine | H04N 7/17318 |
| | | | | 715/835 |
| 2012/0157134 | A1* | 6/2012 | Lee | H04L 51/063 |
| | | | | 455/466 |
| 2013/0013683 | A1* | 1/2013 | Elliott | H04L 51/10 |
| | | | | 709/204 |
| 2013/0262588 | A1* | 10/2013 | Barak | G06K 9/00221 |
| | | | | 709/204 |
| 2013/0332526 | A1* | 12/2013 | Hurley | G06F 3/0488 |
| | | | | 709/204 |
| 2013/0332856 | A1* | 12/2013 | Sanders | G06F 3/0481 |
| | | | | 715/753 |
| 2014/0032726 | A1* | 1/2014 | Liang | H04L 67/306 |
| | | | | 709/222 |
| 2014/0095632 | A1* | 4/2014 | Grosz | H04N 1/00161 |
| | | | | 709/206 |
| 2014/0129627 | A1* | 5/2014 | Baldwin | G06Q 10/10 |
| | | | | 709/204 |
| 2014/0193047 | A1* | 7/2014 | Grosz | G06Q 10/10 |
| | | | | 382/118 |
| 2014/0214986 | A1* | 7/2014 | Hwang | H04L 51/046 |
| | | | | 709/206 |
| 2014/0365581 | A1* | 12/2014 | Kennon | H04L 63/102 |
| | | | | 709/205 |
| 2014/0372540 | A1* | 12/2014 | Libin | H04L 12/1822 |
| | | | | 709/206 |
| 2015/0172238 | A1* | 6/2015 | Ahmed | H04N 21/4788 |
| | | | | 709/217 |
| 2015/0195314 | A1* | 7/2015 | Reed | G06Q 50/01 |
| | | | | 709/204 |
| 2015/0271316 | A1* | 9/2015 | Kim | H04M 1/72552 |
| | | | | 715/752 |
| 2015/0288632 | A1* | 10/2015 | Zheng | H04L 51/32 |
| | | | | 709/206 |
| 2017/0193044 | A1* | 7/2017 | Huibers | G06F 16/22 |
| 2018/0337994 | A1* | 11/2018 | Dachille | H04L 67/1097 |

FOREIGN PATENT DOCUMENTS

| | | |
|---|---|---|
| CN | 101741872 A | 6/2010 |
| CN | 102591980 A | 7/2012 |
| CN | 102857530 A | 1/2013 |
| CN | 103338256 A | 10/2013 |

OTHER PUBLICATIONS

Sarvas R, Viikari M, Pesonen J, Nevanlinna H. MobShare: controlled and immediate sharing of mobile images. InProceedings of the 12th annual ACM international conference on Multimedia Oct. 10, 2004 (pp. 724-731). ACM (Year: 2004).*

Sarvas R, Viikar M, Pesonen J, Nevanlinna H. MobShare; controlled and immediate sharing of mobile images. InProceedings of the 12th annual ACM International Conference on Multimedia Oct. 10, 2004 (pp. 724-731). ACM.

China Intellectual Property Office, Office Action dated Nov. 21, 2014, in China Patent Application No. 201310270064.9.

China Intellectual Property Office, Office Action dated Feb. 4, 2015, in China Patent Application No. 201310270064.9.

China Intellectual Property Office, Office Action dated Jun. 2, 2015, in China Patent Application No. 201310270064.9.

The World Intellectual Property Office (WIPO) International Search Report and Written Opinion of the International Searching Authority for in PCT/CN2013/090823 dated Mar. 27, 2014.

The World Intellectual Property Office (WIPO) International Preliminary Report on Patentability for PCT/CN2013/090823, dated Dec. 29, 2015.

* cited by examiner

SYSTEMS AND METHODS FOR IMAGE SHARING

CROSS-REFERENCES TO RELATED APPLICATIONS

This application is a continuation application of U.S. patent application Ser. No. 14/742,832, filed on Jun. 18, 2015; U.S. patent application Ser. No. 14/742,832 is a continuation application of PCT Patent Application No. PCT/CN2013/090823, filed on Dec. 30, 2013, which claims priority to Chinese Patent Application No. 201310270064.9, filed Jun. 28, 2013, the entire contents of all of which are incorporated by reference herein for all purposes.

BACKGROUND OF THE INVENTION

Certain embodiments of the present invention are directed to computer technology. More particularly, some embodiments of the invention provide systems and methods for communication technology. Merely by way of example, some embodiments of the invention have been applied to image sharing. But it would be recognized that the invention has a much broader range of applicability.

Social networking services (SNS) often provide online shared albums as a fundamental and essential feature. Many SNS websites, such as Renren and Kaixin, offer shared album services. Some instant messaging applications, such as QQ, WeChat and Fetion, also provide shared album services. A user uploads his/her photos or images to a shared album created beforehand on a SNS website so that other users can browse or comment on the album, hence realizing image sharing.

At present, there are usually two types of shared albums in a messaging application. For example, a shared album is exclusive to a single user and only the user can upload images to the shared album for other users to browse or comment. In another example, a shared album is dedicated to an entire conversation group (such as a QQ group) of which members can upload images to this shared album for the other members to browse or comment. However, a user often needs to choose to upload images to a shared album in a messaging application, which limits the sources of images for the shared album. In addition, for a conversation group, particularly a temporary conversation group, such as a discussion group in QQ, the images shared by the members during a conversation and the comments on the images are not accumulated and stored, which makes it inconvenient for future image viewing and management.

Hence it is highly desirable to improve the techniques for image sharing.

BRIEF SUMMARY OF THE INVENTION

According to one embodiment, a method is provided for image sharing. For example, a terminal sends to a server a conversation-processing request to request to release a target conversation message from a current user of a messaging application to a conversation group; the server receives the conversation-processing request, acquires the target conversation message from the conversation-processing request, determines whether the target conversation message includes a first image; in response to the target conversation message including a first image, the server stores the first image in a shared album corresponding to the conversation group and forward the target conversation message to members of the conversation group.

According to another embodiment, a method is provided for image sharing. For example, a conversation-processing request is sent to a server to request to release a target conversation message from a current user of a messaging application to a conversation group; the server receives the conversation-processing request, acquires the target conversation message from the conversation-processing request, and determines whether the target conversation message includes a first image; in response to the target conversation message including a first image, the first image is uploaded to a shared album corresponding to the conversation group.

According to yet another embodiment, a method is provided for image sharing. For example, a conversation-processing request is received from a terminal, the conversation-processing request being used to request to release a target conversation message from a current user of a messaging application to a conversation group; the target conversation message is acquired from the conversation-processing request; whether the target conversation message includes a first image is determined; in response to the target conversation message including a first image, the first image is stored in a shared album corresponding to the conversation group; and the target conversation message is forwarded to members of the conversation group.

In one embodiment, an image-sharing device includes a receiving module, a first determination module, a first storage module, and a forwarding module. The receiving module is configured to receive a conversation-processing request from a terminal, the conversation-processing request being configured for requesting to release a target conversation message from a current user of a messaging application to a conversation group. The first determination module is configured to acquire the target conversation message from the conversation-processing request and determine whether the target conversation message includes a first image. The first storage module is configured to, in response to the target conversation message including a first image, store the first image in a shared album corresponding to the conversation group. The forwarding module is configured to forward the target conversation message to members of the conversation group.

In another example, a server includes an image-sharing device. The image-sharing device includes a receiving module, a first determination module, a first storage module, and a forwarding module. The receiving module is configured to receive a conversation-processing request from a terminal, the conversation-processing request being configured for requesting to release a target conversation message from a current user of a messaging application to a conversation group. The first determination module is configured to acquire the target conversation message from the conversation-processing request and determine whether the target conversation message includes a first image. The first storage module is configured to, in response to the target conversation message including a first image, store the first image in a shared album corresponding to the conversation group. The forwarding module is configured to forward the target conversation message to members of the conversation group.

In yet another example, an image-sharing device operating on a terminal includes a sending unit and an upload unit. The sending unit is configured to send to a server a conversation-processing request to request to release a target conversation message from a current user of a messaging application to a conversation group. The server is configured to acquire the target conversation message from the conversation-processing request and determine whether the target conversation message includes a first image. The upload unit is configured to, in response to the target conversation message including a first image, upload the first image to a shared album corresponding to the conversation group.

According to one embodiment, an image-sharing system includes: a server including a first image-sharing device and a terminal including a second image-sharing device. The first image-sharing device includes: a receiving module, a first determination module, a first storage module, and a forwarding module. The receiving module is configured to receive a conversation-processing request from the terminal, the conversation-processing request being configured for requesting to release a target conversation message from a current user of a messaging application to a conversation group. The first determination module is configured to acquire the target conversation message from the conversation-processing request and determine whether the target conversation message includes a first image. The first storage module is configured to, in response to the target conversation message including a first image, store the first image in a shared album corresponding to the conversation group. The forwarding module is configured to forward the target conversation message to members of the conversation group. The second image-sharing device includes: a sending unit and an upload unit. The sending unit is configured to send to the server the conversation-processing request. The upload unit is configured to, in response to the target conversation message including the first image, upload the first image to the shared album corresponding to the conversation group.

According to another embodiment, a non-transitory computer readable storage medium includes programming instructions for image sharing. The programming instructions configured to cause one or more data processors to execute certain operations. For example, a terminal sends to a server a conversation-processing request to request to release a target conversation message from a current user of a messaging application to a conversation group; the server receives the conversation-processing request, acquires the target conversation message from the conversation-processing request, determines whether the target conversation message includes a first image; in response to the target conversation message including a first image, the server stores the first image in a shared album corresponding to the conversation group and forward the target conversation message to members of the conversation group.

According to yet another embodiment, a non-transitory computer readable storage medium includes programming instructions for image sharing. The programming instructions configured to cause one or more data processors to execute certain operations. For example, a conversation-processing request is sent to a server to request to release a target conversation message from a current user of a messaging application to a conversation group; the server receives the conversation-processing request, acquires the target conversation message from the conversation-processing request, and determines whether the target conversation message includes a first image; in response to the target conversation message including a first image, the first image is uploaded to a shared album corresponding to the conversation group.

According to yet another embodiment, a non-transitory computer readable storage medium includes programming instructions for image sharing. The programming instructions configured to cause one or more data processors to execute certain operations. For example, a conversation-processing request is received from a terminal, the conversation-processing request being used to request to release a target conversation message from a current user of a messaging application to a conversation group; the target conversation message is acquired from the conversation-processing request; whether the target conversation message includes a first image is determined; in response to the target conversation message including a first image, the first image is stored in a shared album corresponding to the conversation group; and the target conversation message is forwarded to members of the conversation group.

Depending upon embodiment, one or more benefits may be achieved. These benefits and various additional objects, features and advantages of the present invention can be fully appreciated with reference to the detailed description and accompanying drawings that follow.

DETAILED DESCRIPTION OF THE INVENTION

Figure 1:
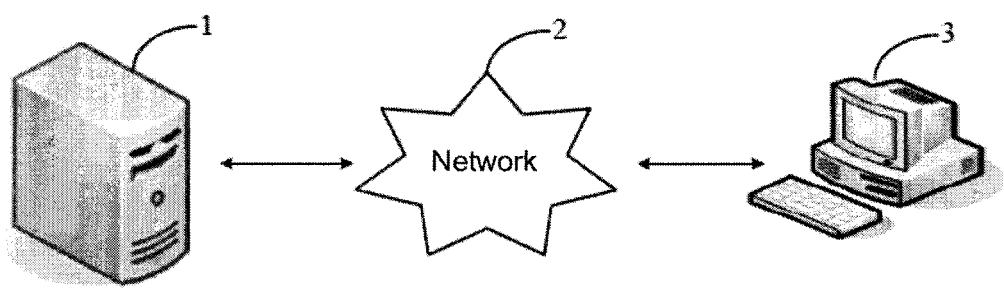
FIG. 1 is a simplified diagram showing an environment for image sharing according to one embodiment of the present invention.

FIG. 1 is a simplified diagram showing an environment for image sharing according to one embodiment of the present invention. This diagram is merely an example, which should not unduly limit the scope of the claims. One of ordinary skill in the art would recognize many variations, alternatives, and modifications.

As shown in FIG. 1, a server 1 engages in network communications with one or more terminals (e.g., terminal 3) via a network 2, in some embodiments. For example, the server 1 includes one or more servers. In another example, the server 1 includes a virtual cloud computing module. In yet another example, the terminal 3 includes a desktop, a laptop, a cell phone, a tablet, a PDA or other suitable calculation units. In yet another example, the network 2 includes the Internet, a mobile Internet (e.g., a 2G and/or 3G network supplied by a telecommunication service provider), or a local area network (e.g., wired or wireless).

Figure 2:
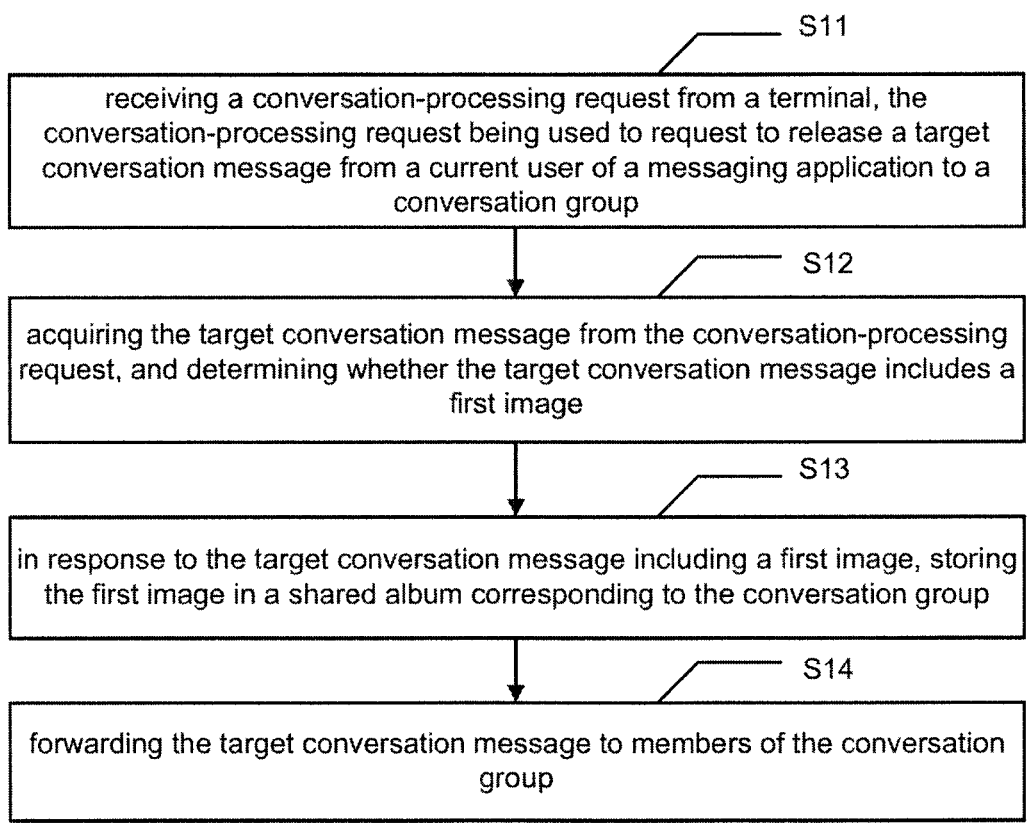
FIG. 2 is a simplified diagram showing a method for image sharing according to one embodiment of the present invention.

FIG. 2 is a simplified diagram showing a method for image sharing according to one embodiment of the present invention. This diagram is merely an example, which should not unduly limit the scope of the claims. One of ordinary skill in the art would recognize many variations, alternatives, and modifications. The method 200 includes at least the processes S11-S12.

According to one embodiment, the process S11 includes: receiving a conversation-processing request sent from the terminal 3, where the conversation-processing request is configured to request to release a target conversation message input by an online user of a messaging application to a conversation group. For example, the process S12 includes: acquiring the target conversation message from the conversation-processing request and determining whether the target conversation message includes an image. In another example, the process S13 includes: if the target conversation message includes an image, storing the image in a shared album corresponding to the conversation group. In yet another example, the process S14 includes forwarding the target conversation message to other members of the conversation group.

In some embodiments, after a conversation-processing request to request to release a target conversation message to a conversation group of a messaging application is received from the terminal 3, if it is determined that the target conversation message includes an image, the image is stored in the shared album of the conversation group, which can provide additional image sources for the shared album and allow accumulation and storage of the images shared in the conversation group, hence facilitating future image view and management.

In certain embodiments, the messaging application specified in the process S11 includes social messaging applications and instant messaging applications. For example, the social messaging applications include QQ Space and Renren, and the instant messaging applications include QQ, WeChat and Fetion. In another example, a messaging application is installed in the server 1, and the terminal 3 includes a client of the messaging application. As an example, specifically, an online user needs to take the following operations to log in the messaging application: the online user inputs a login account into the client of the messaging application, where the login account includes a username and a password that are obtained in advance; the client of the messaging application delivers the login account to the server 1 to validate; when the server 1 confirms the validity of the login account, the online user logs in successfully and can choose one or more conversation objects on the client of the messaging application. In another example, the conversation object includes a contact person related to the login account, a fixed conversation group that the account joins (such as a QQ group) or a temporary conversation group (such as a QQ discussion group).

In some embodiments, the terminal 3 issues the conversation-processing request according to the user's operations. For example, the user includes an online user or a third party. As an example, specifically, the user can first choose an identifier of the conversation group, such as an icon and a name of the conversation group, to release the target conversation message on the client of the messaging application. In another example, members of the conversation group include the online user and a couple of other members. Upon receipt of the user's choice on the conversation group identifier, the client of the messaging application calls a conversation window management module, utilizes a Windows window-related application programming interface (API) to create a conversation window for the conversation group and displays the conversation window on the screen of the terminal 3.

Figure 3:
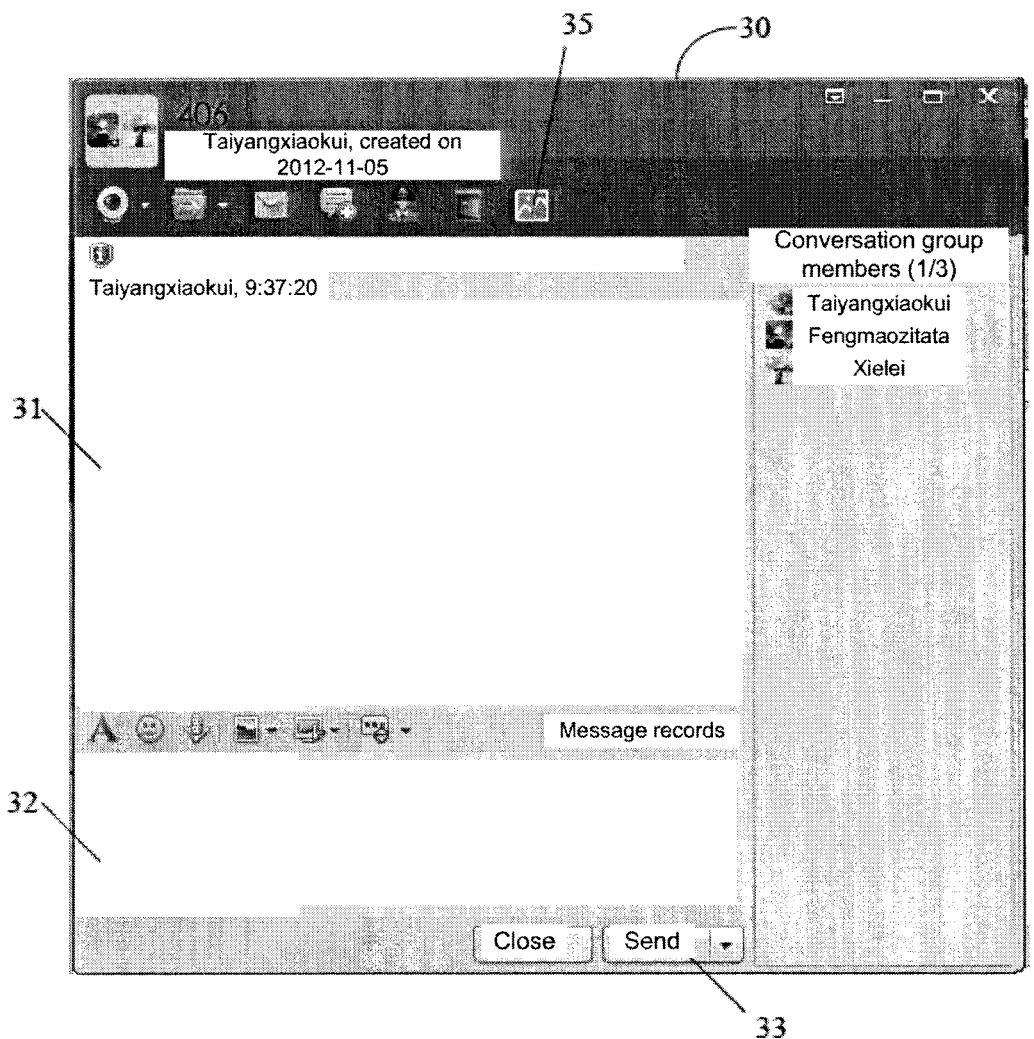
FIG. 3 is a simplified diagram showing a conversation window for image sharing according to one embodiment of the present invention.

FIG. 3 is a simplified diagram showing a conversation window for image sharing according to one embodiment of the present invention. This diagram is merely an example, which should not unduly limit the scope of the claims. One of ordinary skill in the art would recognize many variations, alternatives, and modifications.

As shown in FIG. 3, a conversation window 30 includes a first display area 31 and a second display area 32, in some embodiments. For example, the first display area 31 is configured to display conversation message(s) already released in the conversation group. In another example, the second display area 32 is configured to synchronously display the target conversation message that the online user inputs to be released to the conversation group. The target conversation message may, for instance, include one or more images, texts, audio and video. In yet another example, the conversation window 30 is also furnished with various options, such as a screenshot option, a video call initiation option, an option to close the conversation window, and a conversation message sending option (e.g., the button 33). For example, when the online user inputs in the second display area 31 the target conversation message to be released and chooses the conversation message sending option 33, the terminal 3 sends to the server 1 the conversation-processing request to request to release the target conversation message to the conversation group. As an example, besides the target conversation message, the conversation-processing request may further include a unique identifier of an author of the target conversation message (e.g., the online user), and a unique identifier of the conversation group. For example, the unique identifiers include an identification number (e.g., ID).

Referring back to FIG. 2, after the target conversation message is acquired from the conversation-processing request during the process S12, an ID which uniquely identifies the target conversation message is allocated to the target conversation message, in some embodiments. For example, the ID of the target conversation message may be allocated according to the time when the conversation-processing request is received. In another example, each conversation message already released in the conversation group has a corresponding ID. Specifically, during the process S12, whether the target conversation message includes an image and/or a text can be determined according to certain property data of the target conversation message. For example, the property data of the target conversation message includes: the ID and the type of the target conversation message. Whether the target conversation message includes an image and/or a text can be determined according to the type of the target conversation message indicated in the property data of the target conversation message.

According to one embodiment, the shared album of the conversation group as specified in the process S13 can be stored as a database in the server 1. For example, the shared album is set to be accessible by all members of the conversation group. In an example, after it is determined that the conversation message includes an image, it is necessary to determine whether the image conforms to the preset criterion in order to ensure a higher degree of conformity of the images stored in the shared album. In another example, an image is stored in the shared album only if it conforms to the preset criterion. The preset criterion may include a format or a data size of the image to be stored in the shared album. For instance, the preset criterion may specify that the formats of images that can be stored in the shared album include JPEG (Joint Photographic Experts Group), BMP (Bitmap, standard image file format) and TIFF (Tagged Image File Format). Then, an image in a format of GIF (Graphics Interchange Format) may not satisfy the preset criterion. For instance, the preset criterion may specify that a data size of images to be stored in the shared album needs to exceed 200 KB. Then, an image with a size of less than 200 KB may not satisfy the preset criterion.

In some embodiments, the preset criterion may specify the data size of images that can be stored in the shared album in order to preclude small images that expresses feelings during a conversation, such as a QQ smiley. For instance, the preset criterion may specify the data size of images to be stored in the shared album needs to reach a preset threshold, a minimum side length of the image needs to reach the preset threshold, or the length and the width of the image need to reach a first preset threshold and a second preset threshold, respectively. In another example, if the image size reaches the preset threshold, it is determined that the image satisfies the preset criterion. In yet another example, the preset criterion may also specify that a source address of the image to be stored in the shared album cannot include a preset part (e.g., same as the source address of QQ smiley). In yet another example, if the source address of the image does not include the preset part, it is determined that the image satisfies the preset criterion.

In certain embodiments, whether an image is the same as any image already stored in the shared album is determined before the image is stored in the shared album of the conversation group, considering a limited capacity of the shared album so that the shared album can store as many different images as possible. For example, if the image is not a duplicate of any image stored in the shared album, the image is stored in the shared album of the conversation group. Specifically, an image identification technology may be adopted to compare a particular image with the images already stored in the shared album one by one. Similarity degrees between the particular image and each image already stored in the shared album can be calculated, in some embodiments. For example, it is determined that the particular image is a duplicate if the similarity degree between the particular image and any image already stored in the shared album reaches a threshold. In another example, it is determined that the particular image is different from the stored images in the shared album if the similarity degree between the particular image with any stored image in the shared album does not reach the threshold. In one embodiment, when an image is stored in the shared album, an ID, a storage path, an author (e.g., the online user), a release time and other information of the image may also be added to the indices of the shared album for the convenience of search for the image from the shared album.

In one embodiment, during the process S14, the target conversation message is forwarded to all members of the group except the online user no matter the target conversation message includes an image or not. For example, the unique identifier of the conversation group may be read from the conversation-processing request and a unique identifier of each member of the conversation group can be determined according to the unique identifier of the conversation group. Then the target conversation message is forwarded according to the unique identifier of other members of the conversation group except the online user. As an example, a client of a messaging application running on the terminals used by the other members may also create the conversation window 30 as shown in FIG. 3.

Figure 4:
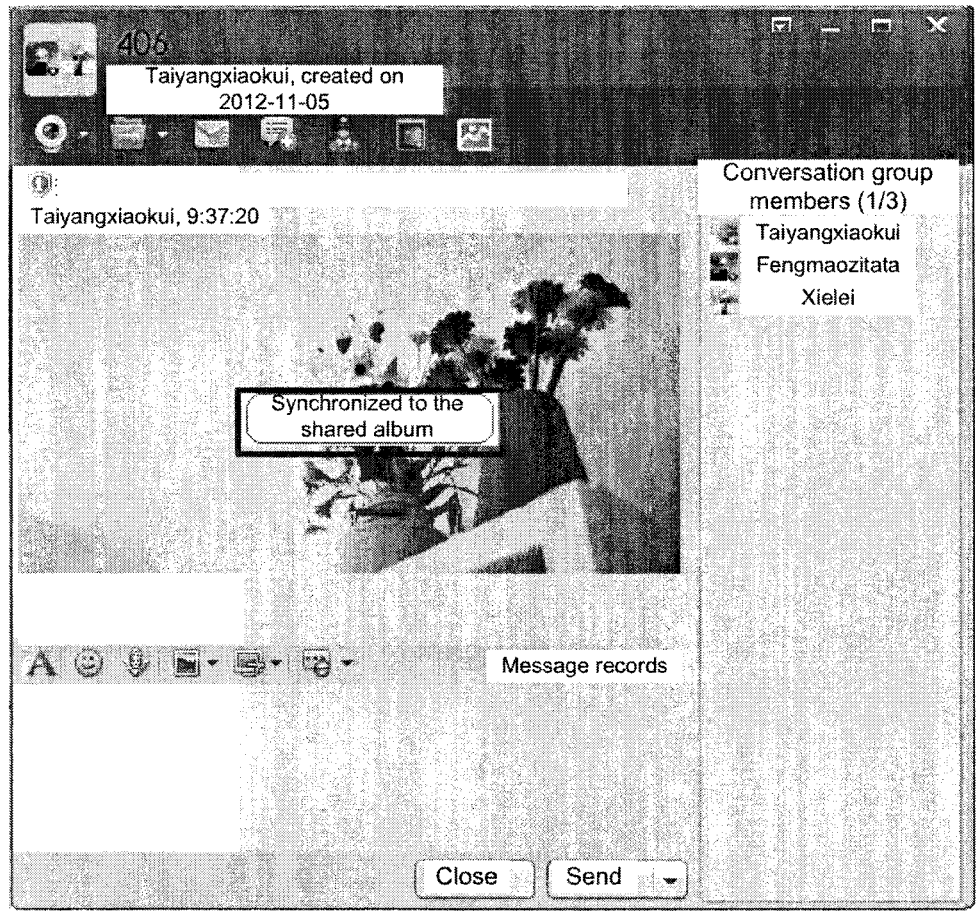
FIG. 4 is a simplified diagram showing a storage prompt message displayed in a conversation window according to one embodiment of the present invention.

FIG. 4 is a simplified diagram showing a storage prompt message displayed in a conversation window according to one embodiment of the present invention. This diagram is merely an example, which should not unduly limit the scope of the claims. One of ordinary skill in the art would recognize many variations, alternatives, and modifications.

According to one embodiment, after receipt of the target conversation message, the client of the messaging application running on the terminals used by the other members displays the target conversation message in the first display area 31 of the conversation window 30. For example, the terminal 3 also displays the released target conversation message in the first display area 31 of the conversation window 30. In another example, if the target conversation message includes an image, a storage prompt message is sent to the other members of the conversation group while the image is forwarded to these members of the conversation group in the process S14, prompting that the image has been stored in the shared album. In yet another example, the terminals used by these members display the storage prompt message, as shown in FIG. 4. As an example, the storage prompt message can be displayed for a short period in a floating manner on the image displayed in the first displaying area 31.

Figure 5:
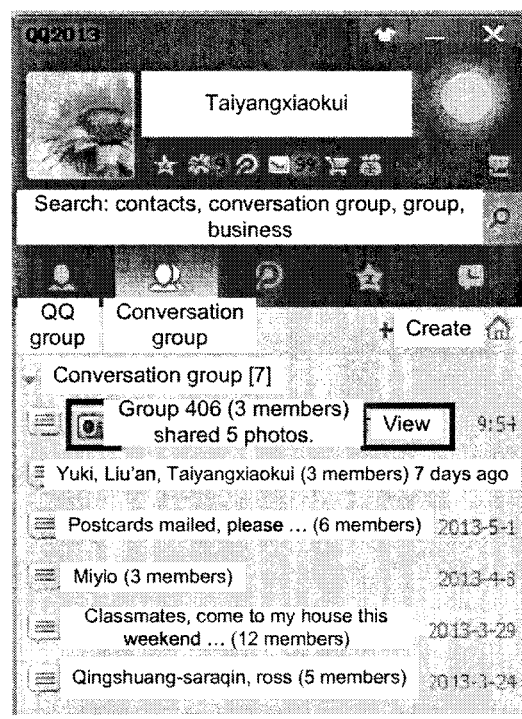
FIG. 5 is a simplified diagram showing a storage prompt message displayed in a conversation window according to another embodiment of the present invention.

FIG. 5 is a simplified diagram showing a storage prompt message displayed in a conversation window according to another embodiment of the present invention. This diagram is merely an example, which should not unduly limit the scope of the claims. One of ordinary skill in the art would recognize many variations, alternatives, and modifications.

According to one embodiment, the storage prompt message may be displayed near the identifier of the conversation group (e.g., a name and an icon of the conversation group)

in the list of conversation groups as shown in the conversation window 30, as shown in FIG. 5. For example, if the target conversation message includes an image, an access message of the image can also be sent to the other members of the conversation group after the image is forwarded to these members of the conversation group in the process S14. In another example, the access message includes the storage path of the image in the server 1. The storage path may take the form of a webpage address (URL, Uniform Resource Locator).

Figure 6:
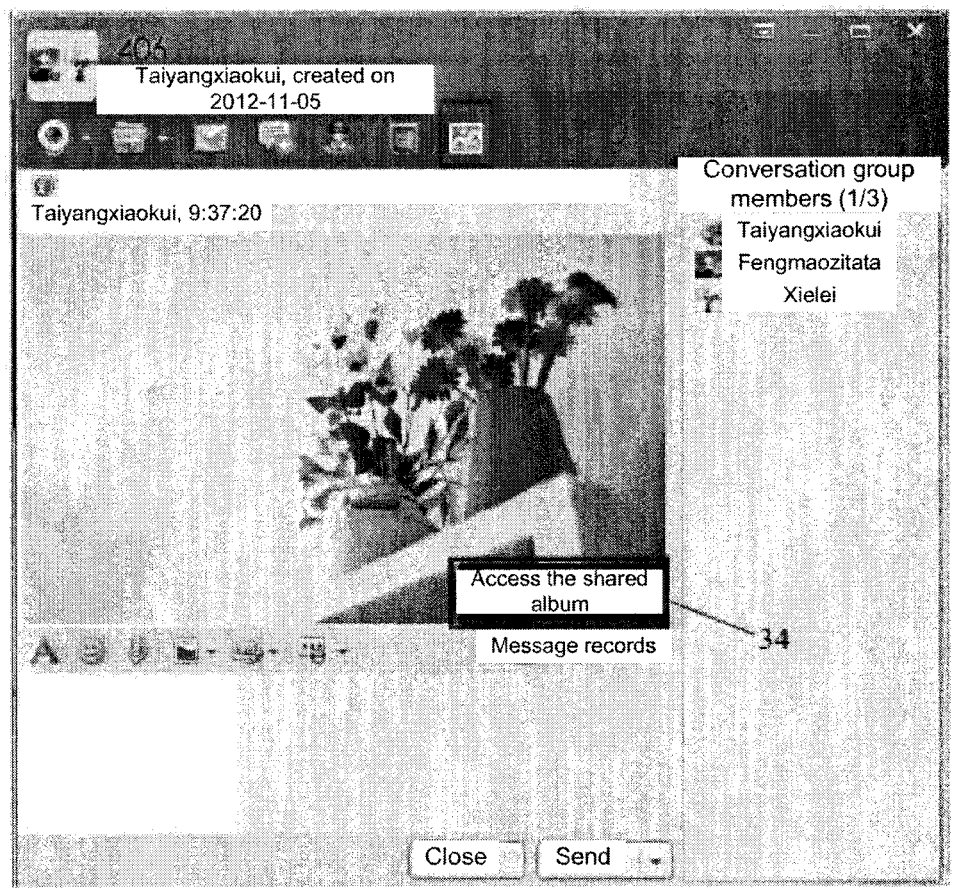
FIG. 6 is a simplified diagram showing access options displayed in a conversation window according to one embodiment of the present invention.

FIG. 6 is a simplified diagram showing access options displayed in a conversation window according to one embodiment of the present invention. This diagram is merely an example, which should not unduly limit the scope of the claims. One of ordinary skill in the art would recognize many variations, alternatives, and modifications.

According to one embodiment, after receiving the access message, the terminals used by those members can generate an access option for access to the shared album to view the image according to the access message and display the access option (e.g., the access option 34) in the conversation window 30, e.g., near the image shown in the first display area 31. For example, the access option may also be displayed on the screen of the terminal in the form of a pop-up window. In another example, after the access option 34 is selected, the client of the messaging application can call the browser to load the page where the image is located in the shared album.

Figure 7:
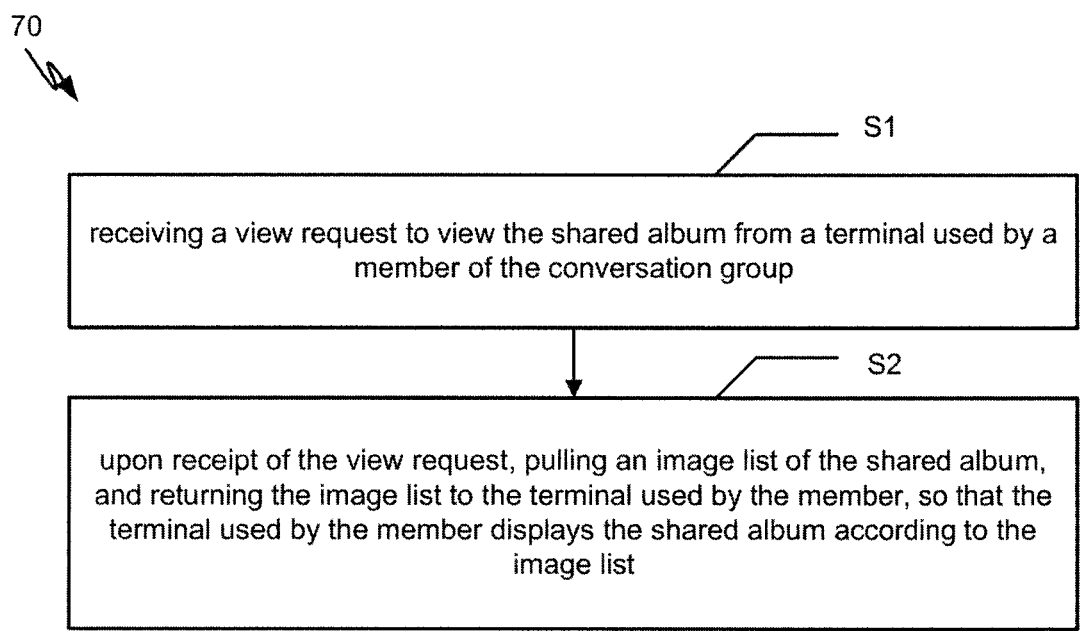
FIG. 7 is a simplified diagram showing a method for image sharing according to another embodiment of the present invention.

FIG. 7 is a simplified diagram showing a method for image sharing according to another embodiment of the present invention. This diagram is merely an example, which should not unduly limit the scope of the claims. One of ordinary skill in the art would recognize many variations, alternatives, and modifications. The method 70 includes at least the processes S1 and S2.

According to one embodiment, the process S1 includes: receiving a view request to view the shared album sent from a terminal used by any member of the conversation group. For example, the conversation window 30 may provide an option to access the shared album for image review, e.g., the option 35 as shown in FIG. 3. In another example, after any member of the conversation group selects the option 35 in the client of the messaging application, the client of the messaging application used by that member sends to the server 1 a request to view the shared album.

According to another embodiment, the process S2 includes: after receiving the view request, pulling an image list of the shared album and returning the image list to the terminal used by the member so that the terminal used by the member displays the shared album according to the image list. For example, the image list contains a storage address, an author, a release time and a view count of each image of the shared album and a sequence of display of the images in the shared album. In another example, the sequence of display of the images in the shared album is based on the respective release times of the images. In yet another example, all images may not be displayed on a same page if there are too many images in the image list. Therefore, the image list may further include pagination information for displaying all the images in the image list in multiple pages, and the number of images displayed on each page.

Figure 8:
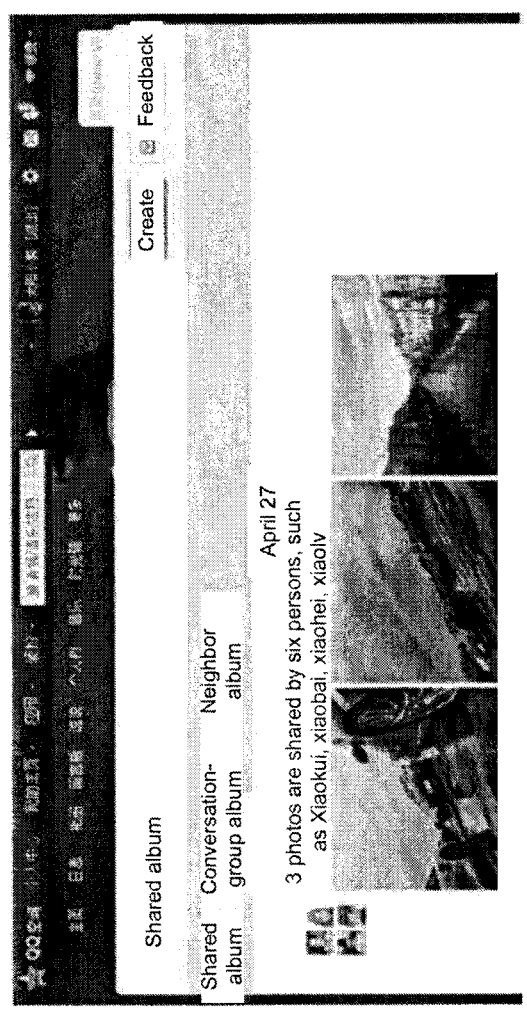
FIG. 8 is a simplified diagram showing certain images of a shared album for image sharing according to yet another embodiment of the present invention.

FIG. 8 is a simplified diagram showing certain images of a shared album for image sharing according to yet another embodiment of the present invention. This diagram is merely an example, which should not unduly limit the scope of the claims. One of ordinary skill in the art would recognize many variations, alternatives, and modifications.

According to one embodiment, a terminal used by a member can call the browser to load the images in the shared album and display them according to their respective release times in order to realize "time line" effects as shown in FIG. 8 so that users can view and manage the images.

Figure 9:
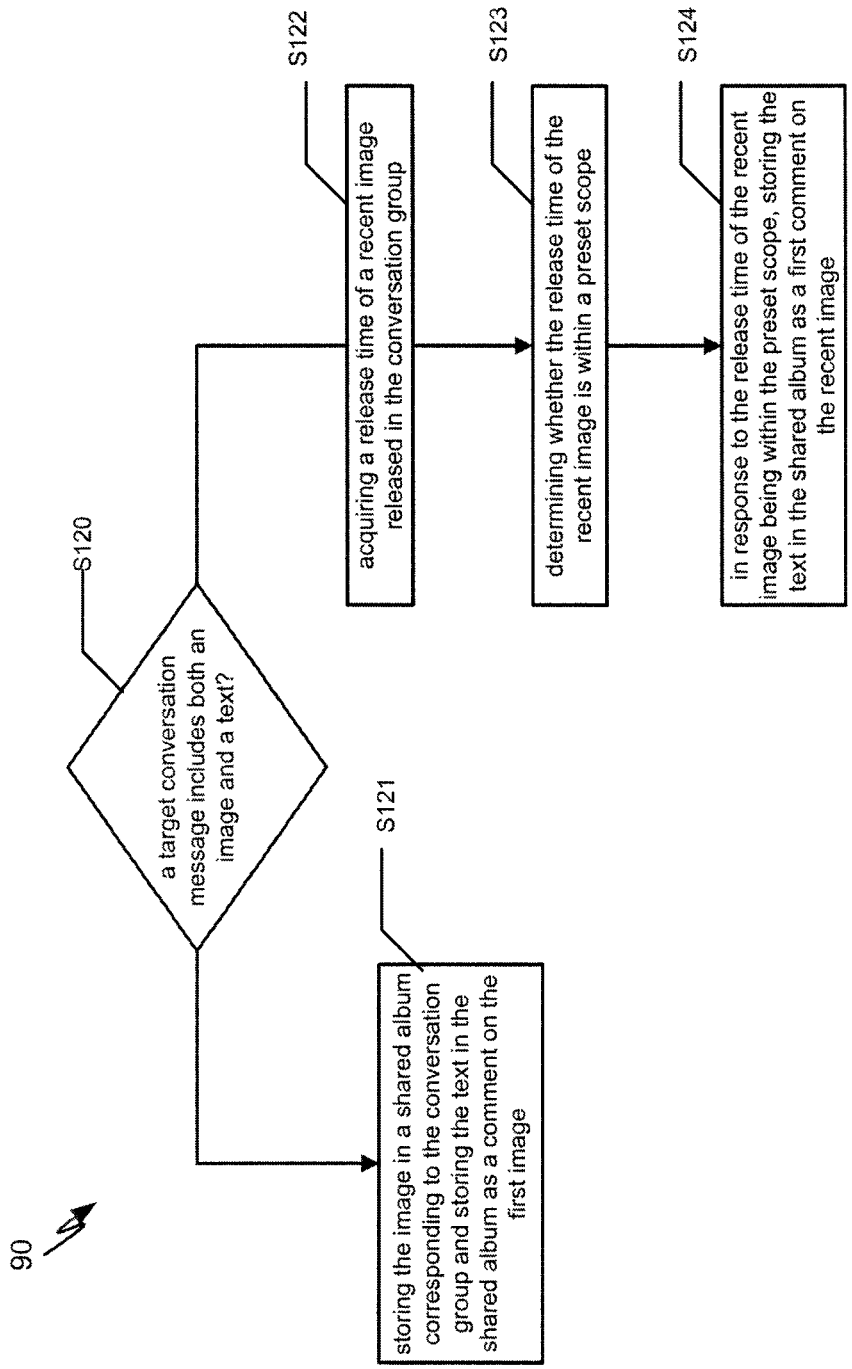
FIG. 9 is a simplified diagram showing a method for image sharing according to yet another embodiment of the present invention.

FIG. 9 is a simplified diagram showing a method for image sharing according to yet another embodiment of the present invention. This diagram is merely an example, which should not unduly limit the scope of the claims. One of ordinary skill in the art would recognize many variations, alternatives, and modifications. The method 70 includes at least the processes S120-S124.

According to one embodiment, besides images, whether a target conversation message includes a text is determined after the target conversation message is acquired from a conversation-processing request during the process S120. For example, if the target conversation message includes both a text and an image, the process S121 is executed. In another example, if the target conversation message only includes a text but not an image, the process S122 is executed. In another example, the process S121 includes: storing the image in the shared album corresponding to the conversation group and storing the text in the shared album as a comment on the image. In yet another example, the process S122 includes: acquiring the release time of a recent image (e.g., the latest image) released in the conversation group. Specifically, as each conversation message already released in the conversation group has a unique ID, the conversation messages already released in the conversation group can be traversed to determine a conversation message that includes an image already stored in the shared album and has an ID closest to the ID of the target conversation message as the recent image (e.g., the latest image). As an example, the release time of the recent image (e.g., the latest image) is acquired.

According to another embodiment, the process S123 includes: determining whether the release time of the recent image (e.g., the latest image) is within a preset scope. For example, members of the conversation group may make comments on an image within a certain period of time after it is released in the group. As an example, the preset scope may be a preset time period prior to receipt of the conversation-processing request, such as one hour. That is, it is determined whether the conversation-processing request is received within one hour after the release time of the recent image (e.g., the latest image).

According to yet another embodiment, the process S124 includes: storing the text in the shared album as a comment on the recent image (e.g., the latest image) if the release time of the recent image (e.g., the latest image) is within the preset scope. For example, to prevent a same member of the conversation group from making a same comment on a same image, it is determined whether the content and the author of the text are the same as those of any existing comment on the recent image (e.g., the latest image) before the text is stored in the shared album as a comment on the recent image (e.g., the latest image). In another example, the text can be stored in the shared album as a comment on the recent image (e.g., the latest image) only if the content and the author of the text are different from those of the existing comments on the recent image (e.g., the latest image).

In some embodiments, the release time, the ID, the author and other information of the comment may also be stored in the shared album together with the comment and then related to the present image or the recent image (e.g., the latest image). For example, the image list specified in the process S2 further includes the information of various comments related to each image of the shared album, including a release time, an author and a number of comments of each image. As an example, each image in the shared album displayed on the terminal used by the member is related to corresponding comment(s) and each comment includes a release time, an author and/or other relevant information. In certain embodiments, a conversation message is stored in a form of a text in the shared album as a comment on an image stored in the shared album to improve the interactions on the images in the shared album.

Figure 10:
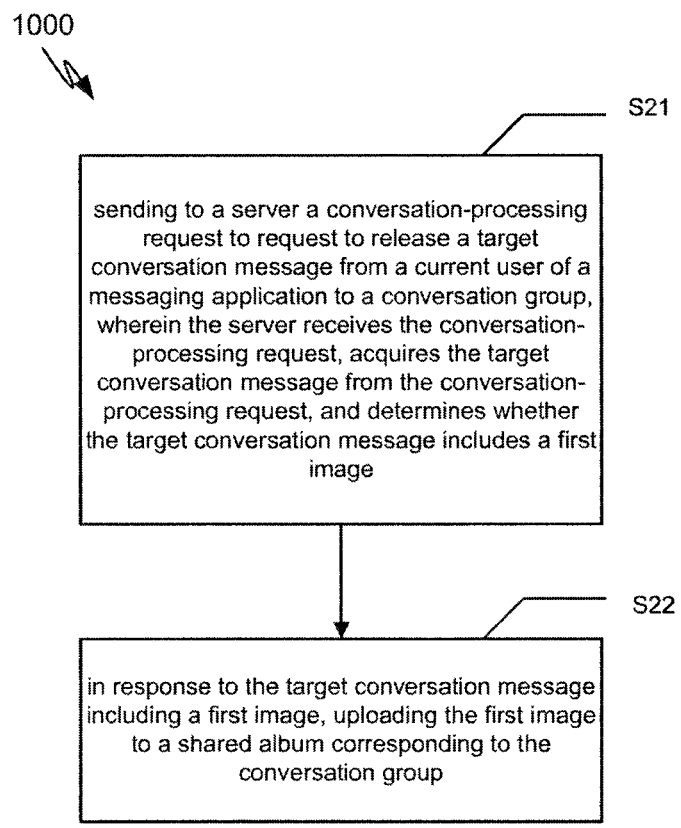
FIG. 10 is a simplified diagram showing a method for image sharing according to yet another embodiment of the present invention.

FIG. 10 is a simplified diagram showing a method for image sharing according to yet another embodiment of the present invention. This diagram is merely an example, which should not unduly limit the scope of the claims. One of ordinary skill in the art would recognize many variations, alternatives, and modifications. The method 1000 includes at least processes S21-S22.

According to one embodiment, the method 1000 is applied in the terminal 3 used by an online user of a messaging application. For example, the process S21 includes: sending to a server 1 a conversation-processing request to request to release a target conversation message input by an online user of a messaging application to a conversation group. In another example, the server 1 receives the conversation-processing request, acquires the target conversation message from the conversation-processing request and determines whether the target conversation message includes an image. In yet another example, the process S22 includes: if it is determined that the target conversation message includes an image, uploading the image to a shared album of the conversation group. In another example, after it is determined that the target conversation message includes an image, whether the image conforms to the preset criterion is determined, such as whether the image size reaches a preset threshold. In yet another example, only if the image conforms to the preset criterion, the image can be uploaded to the shared album of the conversation group. In another example, after it is determined that the target conversation message includes an image, it is determined whether the image is a duplicate of any image already stored in the shared album, and only if the image is not a duplicate of a stored image, the image can be uploaded to the shared album of the conversation group. In certain embodiments, the process S21 and the process S22 are executed similar to the processes S11-S14.

In some embodiments, after a conversation-processing request to request to release a target conversation message to a conversation group of a messaging application is sent to the server 1, if the server 1 determines that the target conversation message includes an image, the image is uploaded to the shared album of the conversation group, which can provide additional image sources for the shared album and allow accumulation and storage of the images shared in the conversation group, hence facilitating future image view and management.

Figure 11:
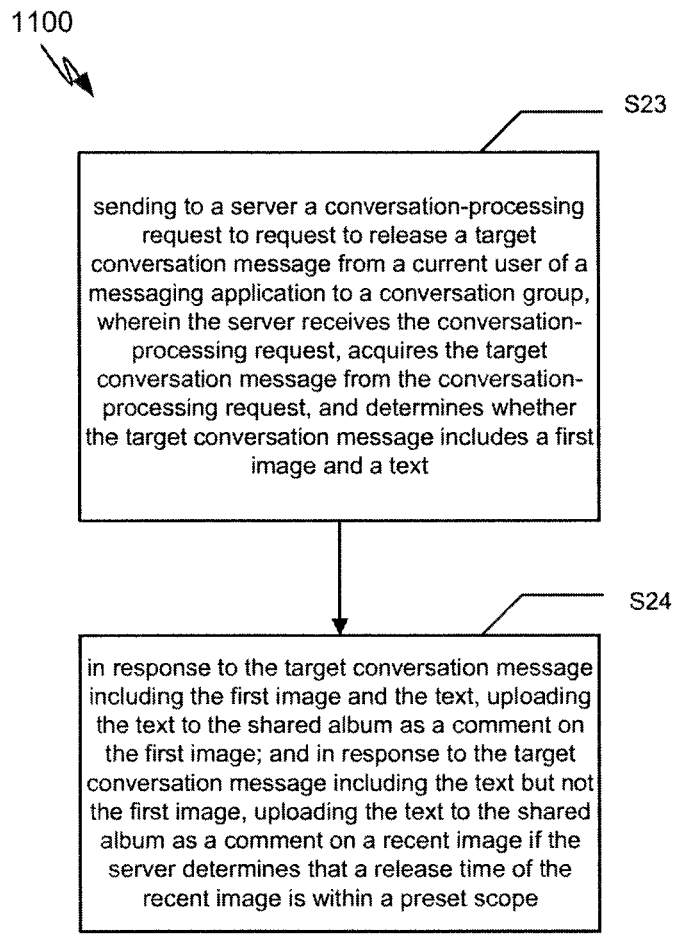
FIG. 11 is a simplified diagram showing a method for image sharing according to yet another embodiment of the present invention.

FIG. 11 is a simplified diagram showing a method for image sharing according to yet another embodiment of the present invention. This diagram is merely an example, which should not unduly limit the scope of the claims. One of ordinary skill in the art would recognize many variations, alternatives, and modifications. The method 1100 includes at least processes S23-S24.

According to one embodiment, the method 1100 is applied in the terminal 3 used by the online user of the messaging application. For example, the server 1 further determines whether the target conversation message includes a text after the target conversation message is acquired from the conversation-processing request in the process S23. In another example, when it is determined that the target conversation message includes both a text and an image, the text is also uploaded to the shared album as a comment on the image after the image is uploaded to the shared album of the conversation group in the process S24. In yet another example, when it is determined that the target conversation message includes only a text but not an image, the text is uploaded to the shared album as the comment on a recent image (e.g., the latest image) if the server 1 determines that the release time of the recent image (e.g., the latest image) in the conversation group is within a preset scope. In certain embodiments, the process S23 and the process S24 are executed similar to the processes S121-S124.

Figure 12:
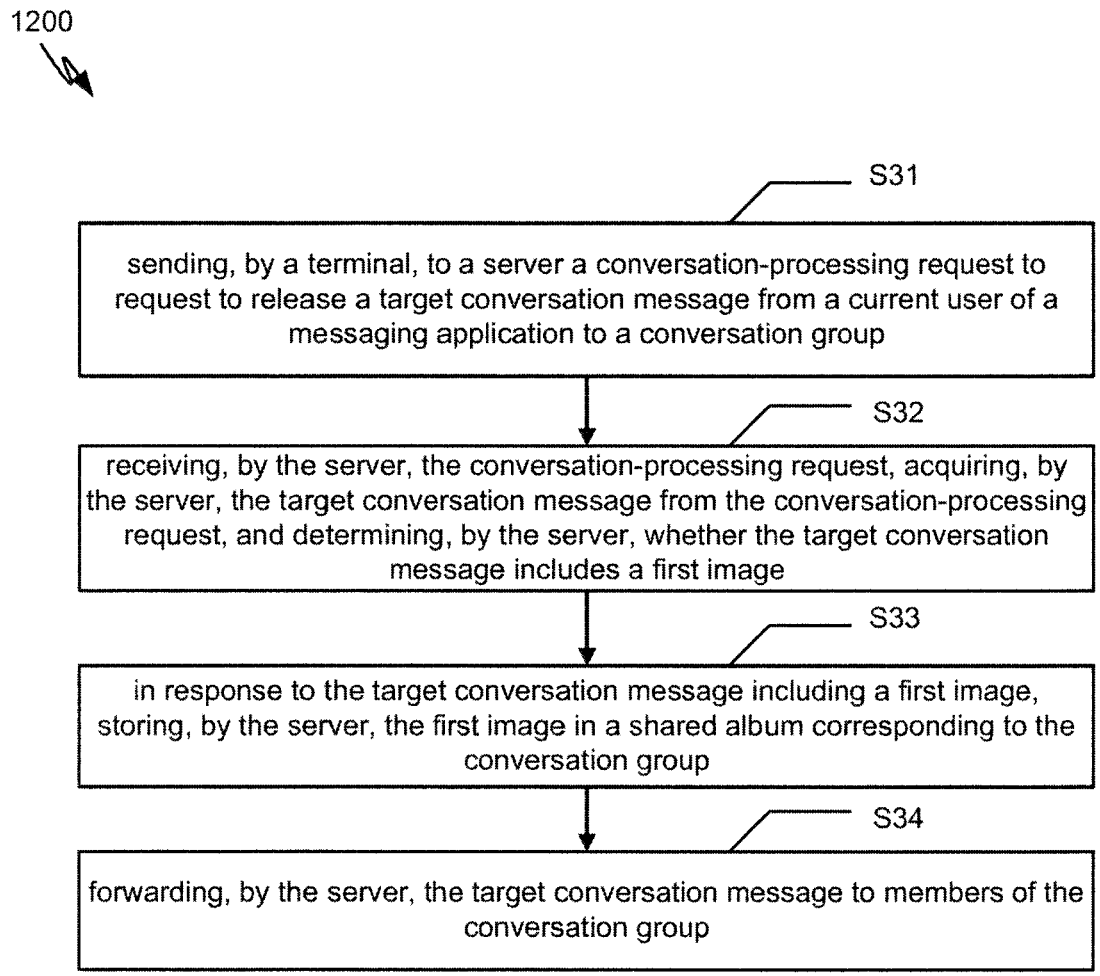
FIG. 12 is a simplified diagram showing a method for image sharing according to yet another embodiment of the present invention.

FIG. 12 is a simplified diagram showing a method for image sharing according to yet another embodiment of the present invention. This diagram is merely an example, which should not unduly limit the scope of the claims. One of ordinary skill in the art would recognize many variations, alternatives, and modifications. The method 1200 includes at least processes S31-S34.

According to one embodiment, during the process S31, the terminal 3 sends to the server 1 a conversation-processing request to request to release a target conversation message input by an online user of a messaging application to a conversation group. For example, during the process S32, the server 1 receives the conversation-processing request, acquires the target conversation message from the conversation-processing request and determines whether the target conversation message includes an image. In another example, during the process S33, if it is determined that the target conversation message includes an image, the server 1 stores the image in a shared album corresponding to the conversation group. In another example, before storing the image to the shared album corresponding to the conversation group, the server 1 first determines whether the image conforms to the preset criterion, such as whether the image size reaches a preset threshold. In yet another example, if the image conforms to the preset criterion, the image is stored in the shared album. In another example, before storing the image to the shared album corresponding to the conversation group, the server 1 determines whether the image is the same as any image already stored in the shared album, and if not, store the image in the shared album of the conversation group. In yet another example, specifically, the server 1 can compare the image with the images already stored in the shared album one by one and calculate similarity degrees between the present image and images already stored in the shared album. It is determined that the image is the same as an image already stored in the shared album if the similarity degree between the image and any image already stored in the shared album reaches a threshold. It is determined that the image is different from any image already stored in the shared album if the similarity degree between the image and any image already stored in the shared album does not reach the threshold.

According to another embodiment, during the process S34, the server 1 forwards the target conversation message to the other members of the conversation group. In an example, if the target conversation message includes an image, a storage prompt message is sent to the other members of the conversation group while the image is forwarded to these members of the conversation group in the process S34, prompting that the image has been stored in the shared album. In another example, if the target conversation message includes an image, an access message of the image can also be sent to the other members of the conversation group after the image is forwarded to these members of the conversation group in the process S34. In yet another example, the access message includes a storage path of the image in the server 1. After receiving the access message, the terminals used by those members can generate and display an access option for access to the shared album to view the image according to the access message, in some embodiments.

Figure 13:
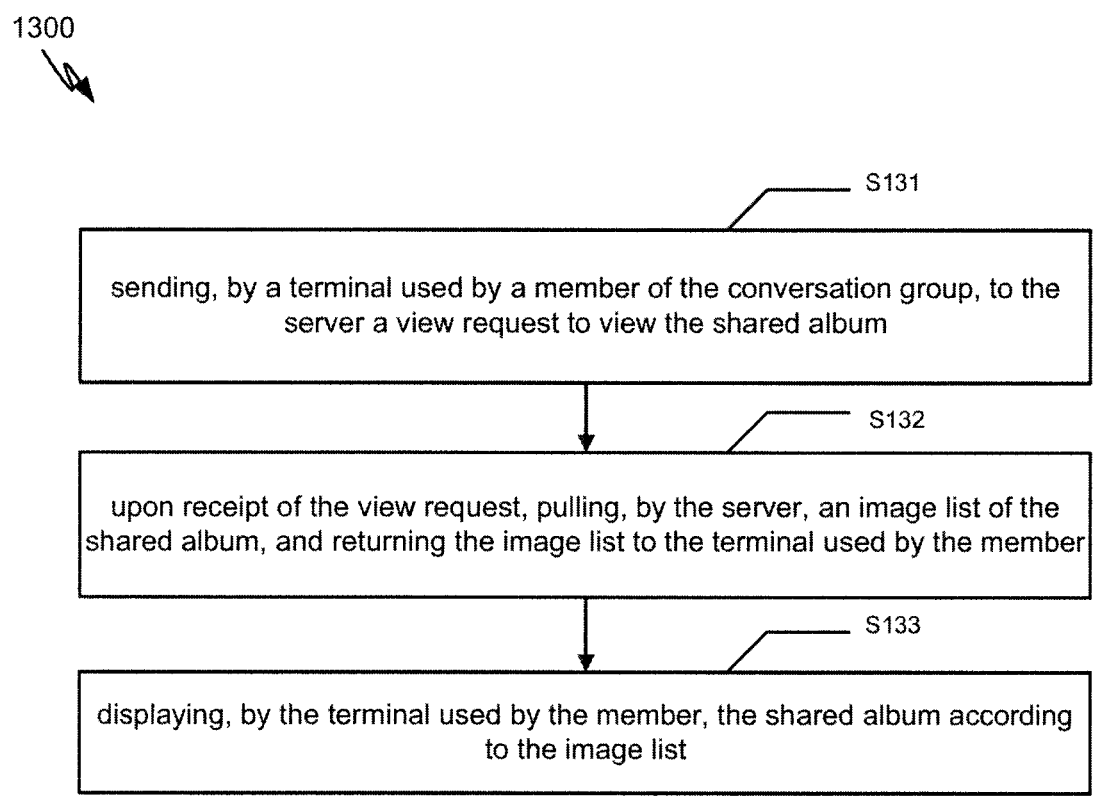
FIG. 13 is a simplified diagram showing a method for image sharing according to yet another embodiment of the present invention.

FIG. 13 is a simplified diagram showing a method for image sharing according to yet another embodiment of the present invention. This diagram is merely an example, which should not unduly limit the scope of the claims. One of ordinary skill in the art would recognize many variations, alternatives, and modifications. The method 1300 includes at least processes S131-S133.

According to one embodiment, during the process 131, a terminal used by any member of the conversation group sends to the server 1 a request to view the shared album. For example, during the process 132, after receiving the view request, the server 1 pulls an image list of the shared album and returns the image list to the terminal used by the member. In another example, during the process 133, the terminal used by the member displays the shared album according to the image list. As an example, the images in the shared album can be displayed according to their release time so that the user can view and manage images.

Figure 14:
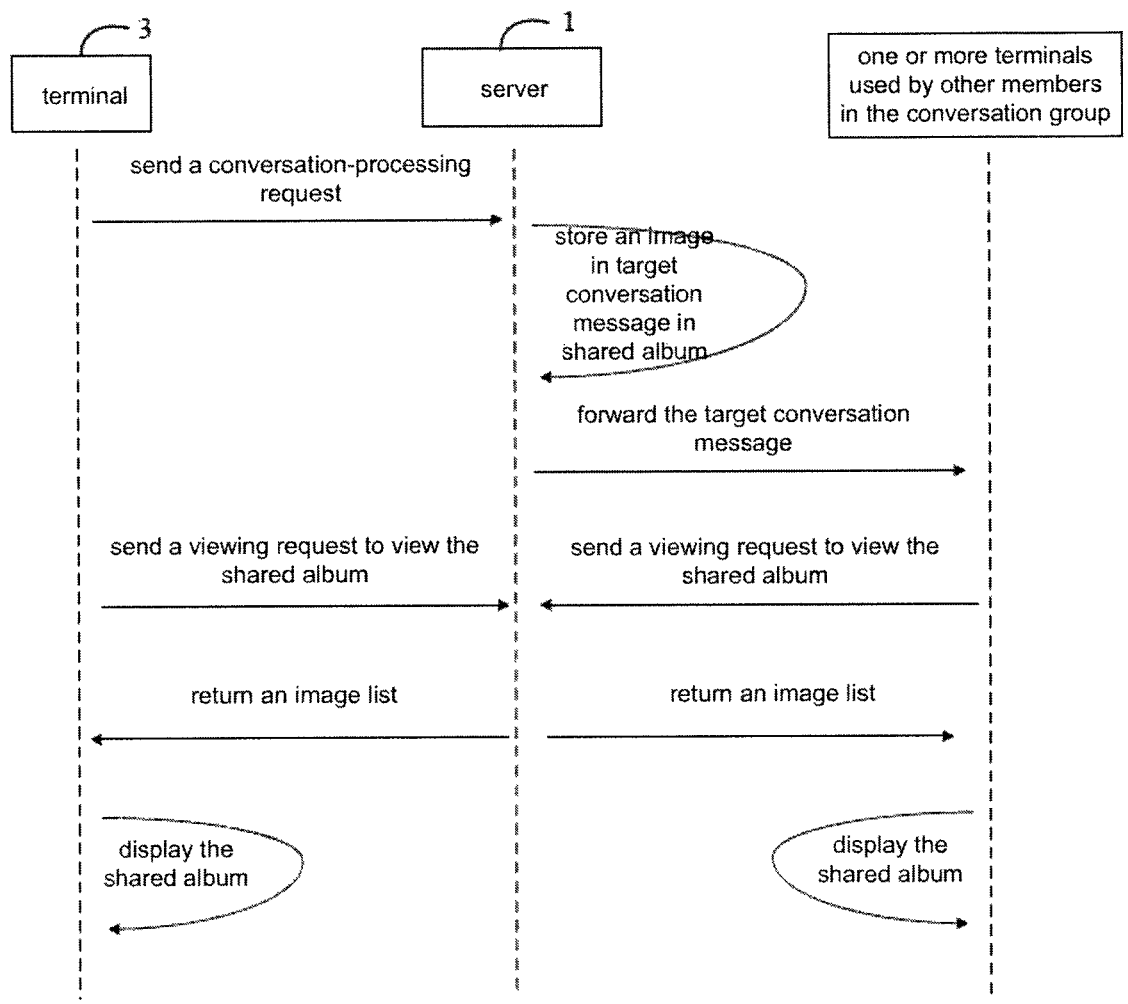
FIG. 14 is a simplified diagram showing interactions between a server, a terminal and/or terminals used by other members in a conversation group according to one embodiment of the present invention.

FIG. 14 is a simplified diagram showing interactions between a server, a terminal and/or terminals used by other members in a conversation group according to one embodiment of the present invention. This diagram is merely an example, which should not unduly limit the scope of the claims. One of ordinary skill in the art would recognize many variations, alternatives, and modifications. As shown in FIG. 14, the server 1, the terminal 3 and the terminals used by the other members of the conversation group interact with each other for image sharing, in some embodiments.

According to one embodiment, after the server 1 receives a conversation-processing request to request to release a target conversation message to a conversation group of a messaging application from the terminal 3, if the server 1 determines that the target conversation message includes an image, the image is stored in the shared album of the conversation group, which can provide additional image sources for the shared album and allow accumulation and storage of the images shared in the conversation group, hence facilitating future image view and management. In certain embodiments, the server 1 also determines whether the target conversation message includes text in the process S32. Correspondingly, when it is determined that the target conversation message includes both a text and an image, the server 1 also stores the text in the shared album as a comment on the image after storing the image in the shared album corresponding to the conversation group in the process S33.

Figure 15:
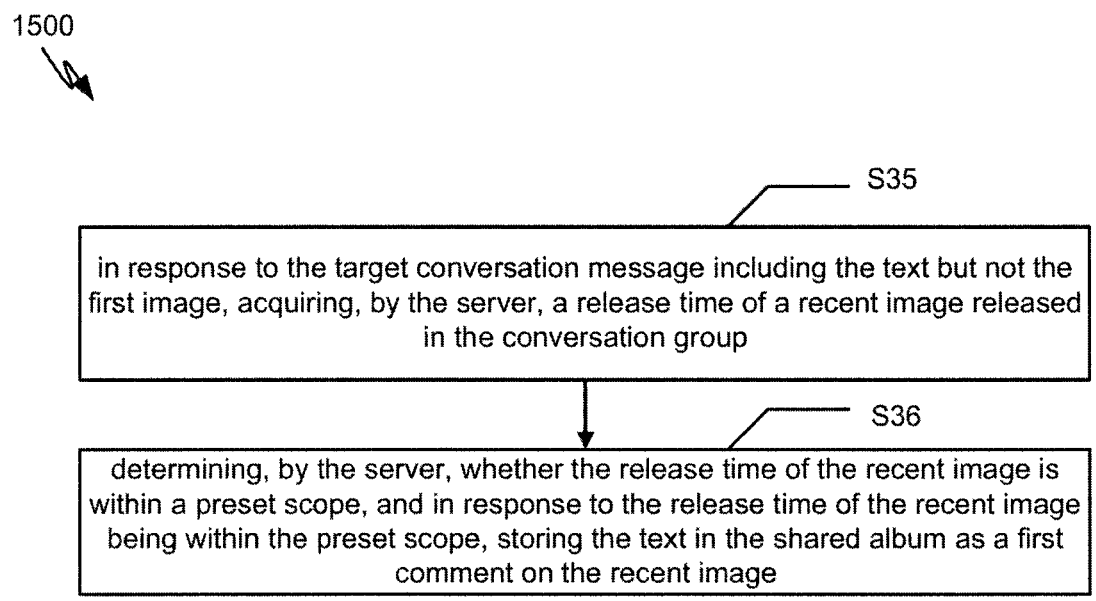
FIG. 15 is a simplified diagram showing a method for image sharing according to yet another embodiment of the present invention.

FIG. 15 is a simplified diagram showing a method for image sharing according to yet another embodiment of the present invention. This diagram is merely an example, which should not unduly limit the scope of the claims. One of ordinary skill in the art would recognize many variations, alternatives, and modifications. The method 1500 includes at least processes S35 and S36.

According to one embodiment, during the process S35, the server 1 acquires the release time of a recent image (e.g., the latest image) released in the conversation group if it is determined that the target conversation message only includes text but no image. For example, during the process S36, the server 1 determines whether the release time of the recent image (e.g., the latest image) is within a preset scope and, if yes, the server 1 stores the text in the shared album as a comment on the recent image (e.g., the latest image). In another example, the server 1 also determines whether the content and author of the text are the same as any existing comment on the recent image (e.g., the latest image) before the text is stored in the shared album as a comment on the recent image (e.g., the latest image), and if not, the server 1 stores the text in the shared album as a comment on the recent image (e.g., the latest image). In yet another example, each image in the shared album displayed on the terminal used by the member is related to corresponding comment(s) in the process S133.

Figure 16:
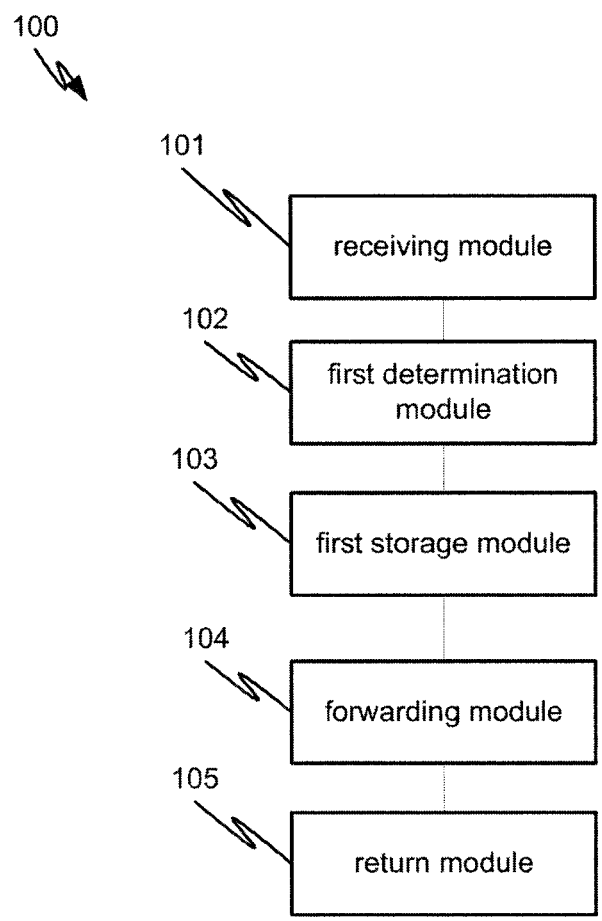
FIG. 16 is a simplified diagram showing a device for image sharing according to one embodiment of the present invention.

FIG. 16 is a simplified diagram showing a device for image sharing according to one embodiment of the present invention. This diagram is merely an example, which should not unduly limit the scope of the claims. One of ordinary skill in the art would recognize many variations, alternatives, and modifications. The image-sharing device 100 operating on the server 1 and includes a receiving module 101, a first determination module 102, a first storage module 103 and a forwarding module 104.

According to one embodiment, the receiving module 101 is configured to receive a conversation-processing request sent from the terminal 3, where the conversation-processing request is configured to request to release a target conversation message input by an online user of a messaging application to a conversation group. For example, the first determination module 102 is configured to acquire the target conversation message from the conversation-processing request and determine whether the target conversation message includes an image. In another example, the first storage module 103 is configured to, if the target conversation message includes an image, store the image in a shared album corresponding to the conversation group. In another example, the first storage module 103 is further configured to determine whether the image conforms to the preset criterion, such as whether the image size reaches a preset threshold, and if yes, store the image in the shared album corresponding to the conversation group. In yet another example, the first storage module 103 is further configured to determine whether the image is the same as any image already stored in the shared album and, if not, store the image in the shared album of the conversation group.

According to another embodiment, the first storage module 103 can compare the image with the images already stored in the shared album one by one and calculate similarity degrees between the present image and images already stored in the shared album. For example, it is determined that the image is the same as an image already stored in the shared album if the similarity degree between the present image and any image already stored in the shared album reaches a threshold. In another example, it is determined that the image is different from any image already stored in the shared album if the similarity degree between the present image and any image already stored in the shared album does not reach the threshold.

According to yet another embodiment, the forwarding module 104 is configured to forward the target conversation message to the other members of the conversation group. In an example, the forwarding module 104 is further configured to send a storage prompt to the members of the conversation group, which indicates that the image has been stored in the shared album. In another example, the forwarding module 104 is further configured to send an access message of the image to the members of the conversation group so that after receiving the access message, the terminals used by those members respectively generate and display an access option for access to the shared album to view the image according to the access message, where the access message includes a storage path of the image.

In one embodiment, the image sharing device 100 further includes: a return module 105 configured to, after receiving a request to view the shared album sent from a terminal used by any member of the conversation group, pull an image list of the shared album and return the image list to the terminal used by the member so that the terminal used by the member displays the shared album according to the image list. For example, the images in the shared album can be displayed according to their respective release times, so that the user can view and manage the images.

Figure 17:
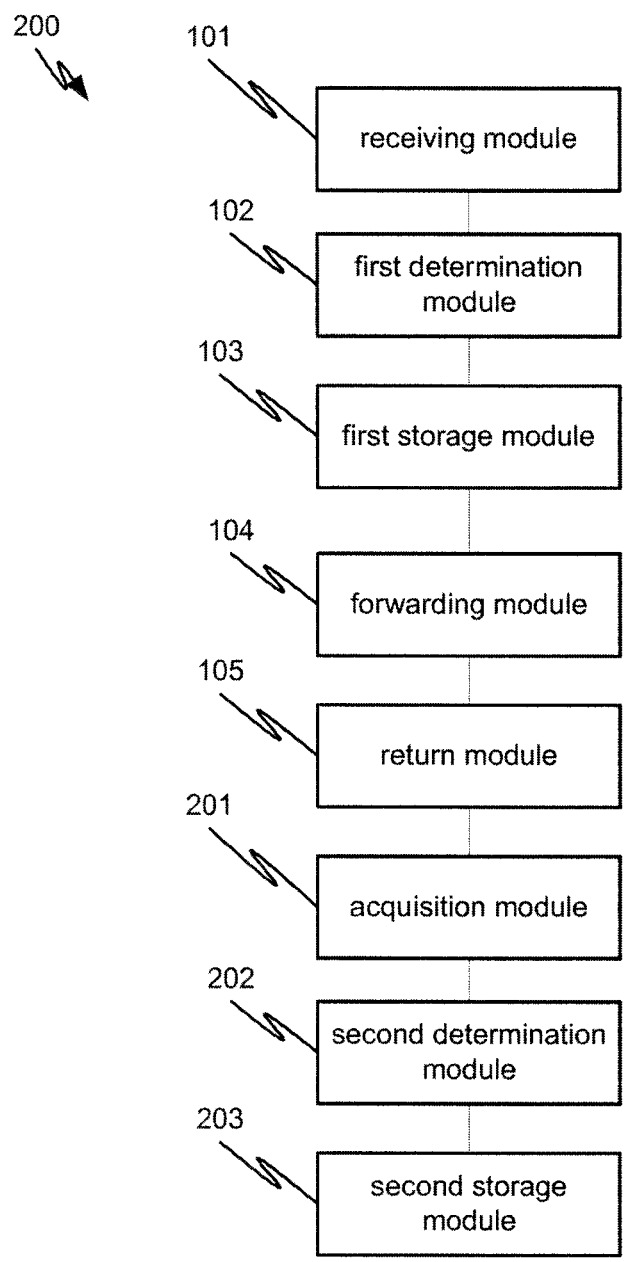
FIG. 17 is a simplified diagram showing a device for image sharing according to another embodiment of the present invention.

FIG. 17 is a simplified diagram showing a device for image sharing according to another embodiment of the present invention. This diagram is merely an example, which should not unduly limit the scope of the claims. One of ordinary skill in the art would recognize many variations, alternatives, and modifications. The image-sharing device 200 includes a receiving module 101, a first determination module 102, a first storage module 103, a forwarding module 104, an acquisition module 201, a second determination module 202, and a second storage module 203.

According to one embodiment, the first determination module 102 is further configured to determine whether the target conversation message includes a text. For example, when it is determined that the target conversation message includes both a text and an image, the first storage module 103 also stores the text in the shared album as a comment on the image after storing the image in the shared album. In another example, the acquisition module 201 is configured to acquire the release time of the recent image (e.g., the latest image) released in the conversation group if the target conversation message only includes text but no image. In yet another example, the second determination module 202 is configured to determine whether the release time of the recent image (e.g., the latest image) is within a preset scope. In yet another example, the second storage module 203 is configured to store the text in the shared album as a comment on the recent image (e.g., the latest image) if the release time of the recent image (e.g., the latest image) is within the preset scope. In an example, it is determined whether the content and the author of the text are the same as those of any existing comment on the recent image (e.g., the latest image) before the text is stored in the shared album as a comment on the recent image (e.g., the latest image). In another example, only if the content and the author of the text are not the same as those of any existing comment on the recent image (e.g., the latest image), the text can be stored in the shared album as a comment on the recent image (e.g., the latest image). In yet another example, each image in the shared album displayed on the terminal used by the member is related to corresponding comment(s) after the return module 105 returns the image list to the terminal used by the member.

Figure 18:
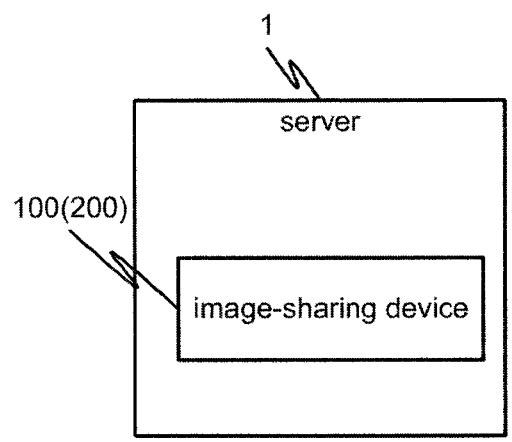
FIG. 18 is a simplified diagram showing a server for image sharing according to another embodiment of the present invention.

FIG. 18 is a simplified diagram showing a server for image sharing according to another embodiment of the present invention. This diagram is merely an example, which should not unduly limit the scope of the claims. One of ordinary skill in the art would recognize many variations, alternatives, and modifications. The server 1 includes the image sharing device 100 or the image sharing device 200.

According to one embodiment, after receiving a conversation-processing request to request to release a target conversation message to a conversation group of a messaging application from the terminal 3, if it is determined that the target conversation message includes an image, the server 1 stores the image in the shared album of the conversation group. For example, if it is determined that the target conversation message includes text and the text conforms to a criterion, the text is stored in the shared album as a comment on the image.

Figure 19:
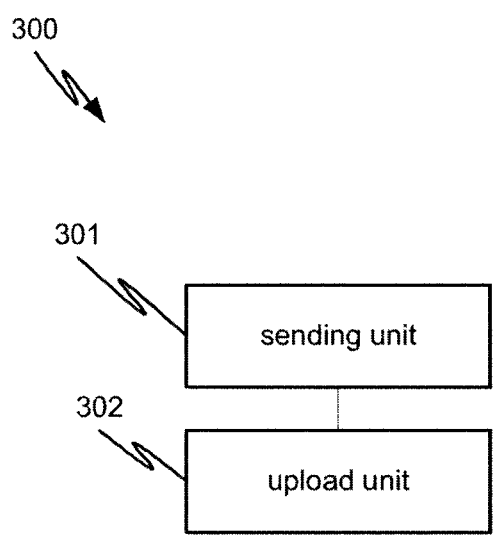
FIG. 19 is a simplified diagram showing a device for image sharing according to yet another embodiment of the present invention.

FIG. 19 is a simplified diagram showing a device for image sharing according to yet another embodiment of the present invention. This diagram is merely an example, which should not unduly limit the scope of the claims. One of ordinary skill in the art would recognize many variations, alternatives, and modifications. The image-sharing device 300 operating on the terminal 3 and includes a sending unit 301 and an upload unit 302.

According to one embodiment, the sending unit 301 is configured to send to the server 1 a conversation-processing request to request to release a target conversation message input by an online user of a messaging application to a conversation group. For example, the server 1 acquires the target conversation message from the conversation-processing request and determines whether the target conversation message includes an image. In another example, the upload unit 302 is configured to, if it is determined that the target conversation message includes an image, upload the image to a shared album of the conversation group.

According to another embodiment, the server 1 also determines whether the target conversation message includes a text. For example, when it is determined that the target conversation message includes both a text and an image, the upload unit 302 further uploads the text to the shared album as a comment on the image after uploading the image to the shared album of the conversation group. In another example, when it is determined that the target conversation message only includes a text but not an image, the upload unit 302 is further configured to upload the text to the shared album as a comment on the recent image (e.g., the latest image) if the server 1 determines that the release time of the recent image (e.g., the latest image) released is within a preset scope.

Figure 20:
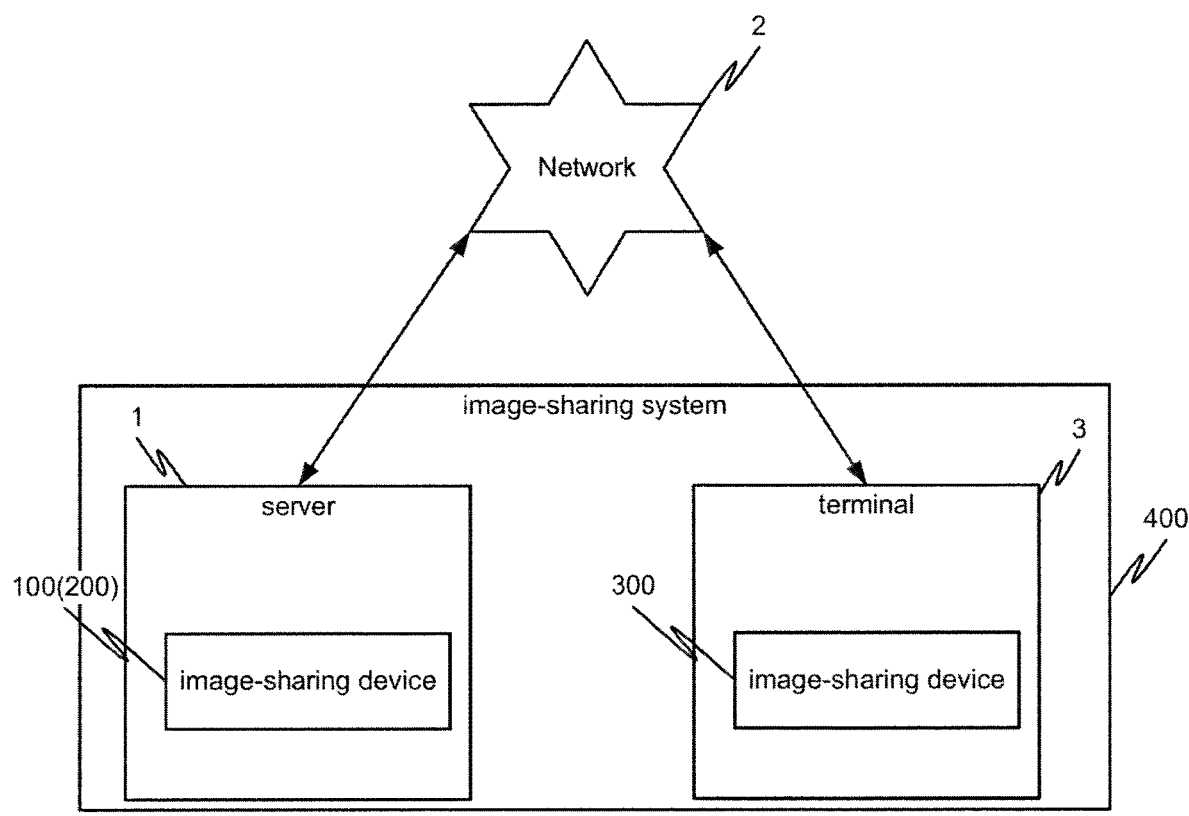
FIG. 20 is a simplified diagram showing a system for image sharing according to one embodiment of the present invention.

FIG. 20 is a simplified diagram showing a system for image sharing according to one embodiment of the present invention. This diagram is merely an example, which should not unduly limit the scope of the claims. One of ordinary skill in the art would recognize many variations, alternatives, and modifications. The image-sharing system 400 includes the server 1 and the terminal 3.

According to one embodiment, the server 1 includes the image sharing device 100 or the image sharing device 200. For example, the terminal 3 includes the image sharing device 300. In another example, after receiving a conversation-processing request to request to release a target conversation message to a conversation group of a messaging application from the terminal 3, if it is determined that the target conversation message includes an image, the server 1 stores the image in the shared album of the conversation group. In another example, if it is determined that the target conversation message includes a text and the text conforms to a criterion, the text is stored in the shared album as a comment on the image.

According to one embodiment, a method is provided for image sharing. For example, a terminal sends to a server a conversation-processing request to request to release a target conversation message from a current user of a messaging application to a conversation group; the server receives the conversation-processing request, acquires the target conversation message from the conversation-processing request, determines whether the target conversation message includes a first image; in response to the target conversation message including a first image, the server stores the first image in a shared album corresponding to the conversation group and forward the target conversation message to members of the conversation group. For example, the method is implemented according to at least FIG. 2, FIG. 7, FIG. 9, FIG. 10, FIG. 11, FIG. 12, FIG. 13, FIG. 14, and/or FIG. 15.

According to another embodiment, a method is provided for image sharing. For example, a conversation-processing request is sent to a server to request to release a target conversation message from a current user of a messaging application to a conversation group; the server receives the conversation-processing request, acquires the target conversation message from the conversation-processing request, and determines whether the target conversation message includes a first image; in response to the target conversation message including a first image, the first image is uploaded to a shared album corresponding to the conversation group. For example, the method is implemented according to at least FIG. 2, FIG. 7, FIG. 9, FIG. 10, FIG. 11, FIG. 12, FIG. 13, FIG. 14, and/or FIG. 15.

According to yet another embodiment, a method is provided for image sharing. For example, a conversation-processing request is received from a terminal, the conversation-processing request being used to request to release a target conversation message from a current user of a messaging application to a conversation group; the target conversation message is acquired from the conversation-processing request; whether the target conversation message includes a first image is determined; in response to the target conversation message including a first image, the first image is stored in a shared album corresponding to the conversation group; and the target conversation message is forwarded to members of the conversation group. For example, the method is implemented according to at least FIG. 2, FIG. 7, FIG. 9, FIG. 10, FIG. 11, FIG. 12, FIG. 13, FIG. 14, and/or FIG. 15.

In one embodiment, an image-sharing device includes a receiving module, a first determination module, a first storage module, and a forwarding module. The receiving module is configured to receive a conversation-processing request from a terminal, the conversation-processing request being configured for requesting to release a target conversation message from a current user of a messaging application to a conversation group. The first determination module is configured to acquire the target conversation message from the conversation-processing request and determine whether the target conversation message includes a first image. The first storage module is configured to, in response to the target conversation message including a first image, store the first image in a shared album corresponding to the conversation group. The forwarding module is configured to forward the target conversation message to members of the conversation group. For example, the device is implemented according to at least FIG. 16, and/or FIG. 17.

In another example, a server includes an image-sharing device. The image-sharing device includes a receiving module, a first determination module, a first storage module, and a forwarding module. The receiving module is configured to receive a conversation-processing request from a terminal, the conversation-processing request being configured for requesting to release a target conversation message from a current user of a messaging application to a conversation group. The first determination module is configured to acquire the target conversation message from the conversation-processing request and determine whether the target conversation message includes a first image. The first storage module is configured to, in response to the target conversation message including a first image, store the first image in a shared album corresponding to the conversation group. The forwarding module is configured to forward the target conversation message to members of the conversation group. For example, the server is implemented according to at least FIG. 16, FIG. 17, and/or FIG. 18.

In yet another example, an image-sharing device operating on a terminal includes a sending unit and an upload unit. The sending unit is configured to send to a server a conversation-processing request to request to release a target conversation message from a current user of a messaging application to a conversation group. The server is configured to acquire the target conversation message from the conversation-processing request and determine whether the target conversation message includes a first image. The upload unit is configured to, in response to the target conversation message including a first image, upload the first image to a shared album corresponding to the conversation group. For example, the device is implemented according to at least FIG. 19.

According to one embodiment, an image-sharing system includes: a server including a first image-sharing device and a terminal including a second image-sharing device. The first image-sharing device includes: a receiving module, a first determination module, a first storage module, and a forwarding module. The receiving module is configured to receive a conversation-processing request from the terminal, the conversation-processing request being configured for requesting to release a target conversation message from a current user of a messaging application to a conversation group. The first determination module is configured to acquire the target conversation message from the conversation-processing request and determine whether the target conversation message includes a first image. The first storage module is configured to, in response to the target conversation message including a first image, store the first image in a shared album corresponding to the conversation group. The forwarding module is configured to forward the target conversation message to members of the conversation group. The second image-sharing device includes: a sending unit and an upload unit. The sending unit is configured to send to the server the conversation-processing request. The upload unit is configured to, in response to the target conversation message including the first image, upload the first image to the shared album corresponding to the conversation group. For example, the system is implemented according to at least FIG. 20.

According to another embodiment, a non-transitory computer readable storage medium includes programming instructions for image sharing. The programming instructions configured to cause one or more data processors to execute certain operations. For example, a terminal sends to a server a conversation-processing request to request to release a target conversation message from a current user of a messaging application to a conversation group; the server receives the conversation-processing request, acquires the target conversation message from the conversation-processing request, determines whether the target conversation message includes a first image; in response to the target conversation message including a first image, the server stores the first image in a shared album corresponding to the conversation group and forward the target conversation message to members of the conversation group. For example, the storage medium is implemented according to at least FIG. 2, FIG. 7, FIG. 9, FIG. 10, FIG. 11, FIG. 12, FIG. 13, FIG. 14, and/or FIG. 15.

According to yet another embodiment, a non-transitory computer readable storage medium includes programming instructions for image sharing. The programming instructions configured to cause one or more data processors to execute certain operations. For example, a conversation-processing request is sent to a server to request to release a target conversation message from a current user of a messaging application to a conversation group; the server receives the conversation-processing request, acquires the target conversation message from the conversation-processing request, and determines whether the target conversation message includes a first image; in response to the target conversation message including a first image, the first image is uploaded to a shared album corresponding to the conversation group. For example, the storage medium is implemented according to at least FIG. 2, FIG. 7, FIG. 9, FIG. 10, FIG. 11, FIG. 12, FIG. 13, FIG. 14, and/or FIG. 15.

According to yet another embodiment, a non-transitory computer readable storage medium includes programming instructions for image sharing. The programming instructions configured to cause one or more data processors to execute certain operations. For example, a conversation-processing request is received from a terminal, the conversation-processing request being used to request to release a target conversation message from a current user of a messaging application to a conversation group; the target conversation message is acquired from the conversation-processing request; whether the target conversation message includes a first image is determined; in response to the target conversation message including a first image, the first image is stored in a shared album corresponding to the conversation group; and the target conversation message is forwarded to members of the conversation group. For example, the storage medium is implemented according to at least FIG. 2, FIG. 7, FIG. 9, FIG. 10, FIG. 11, FIG. 12, FIG. 13, FIG. 14, and/or FIG. 15.

The above only describes several scenarios presented by this invention, and the description is relatively specific and detailed, yet it cannot therefore be understood as limiting the scope of this invention's patent. It should be noted that ordinary technicians in the field may also, without deviating from the invention's conceptual premises, make a number of variations and modifications, which are all within the scope of this invention. As a result, in terms of protection, the patent claims shall prevail.

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, various embodiments and/or examples of the present invention can be combined.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to perform the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions (e.g., software) for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include client devices and servers. A client device and server are generally remote from each other and typically interact through a communication network. The relationship of client device and server arises by virtue of computer programs running on the respective computers and having a client device-server relationship to each other.

While this specification contains many specifics, these should not be construed as limitations on the scope or of what may be claimed, but rather as descriptions of features specific to particular embodiments. Certain features that are described in this specification in the context or separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present invention have been described, it is understood by those of skill in the art that there are other embodiments that are equivalent to the described embodiments. Accordingly, it is to be understood that the invention is not to be limited by the specific illustrated embodiments, but only by the scope of the appended claims.

The invention claimed is:

1. An image-sharing method, comprising:
receiving, by a server, from a terminal a conversation-processing request of releasing a target conversation message from a current user of a messaging application on the terminal to a conversation group, the conversation group being an instant messaging conversation group where members exchange conversation messages with each other, the target conversation message being entered to a conversation window of the messaging application corresponding to the conversation group;
acquiring, by the server, the target conversation message from the conversation-processing request;
determining, by the server, whether the target conversation message includes a first image;
in response to determining that the target conversation message includes a first image, determining, by the server, whether the target conversation message includes a first text; and
after determining that the target conversation message includes the first image and in response to determining that the target conversation message includes a first text, storing, by the server, the first image in a shared album corresponding to the conversation group, together with the first text as a comment from the current user on the first image;
after storing the first image in the shared album corresponding to the conversation group, sending, by the server, a storage prompt to the members of the conversation group, the storage prompt indicating that the first image is stored in the shared album, wherein the storage prompt is displayed within the messaging application to the members of the conversation group;
forwarding, by the server, the target conversation message to the members of the conversation group;
generating and sending, by the server, to the members of the conversation group, an access message of the first image, wherein an access option for accessing the shared album to view the first image based on the access message is displayed near the first image in the conversation window configured to show the exchanged conversation messages of the conversation group in the messaging applications of the members, wherein the access message includes a storage path of the first image for viewing the first image; and
in response to a selection of the access option, by one of the members of the conversation group, enabling by the server, the first image of the shared album to be displayed on the terminal of one of the members of the conversation group, according to the storage path included in the access message.

2. The method of claim 1, wherein the storing, by the server, the first image in a shared album corresponding to the conversation group comprises:
determining whether the first image conforms to a preset criterion; and in response to the first image conforming to the preset criterion, storing the first image in the shared album of the conversation group.

3. The method of claim 1, wherein the storing the first image in a shared album corresponding to the conversation group comprises:
determining whether the first image is a duplicate of one or more second images stored in the shared album; and
in response to the first image not being the duplicate of the second images stored in the shared album, storing the first image in the shared album of the conversation group.

4. The method of claim 1,
wherein the storage prompt is displayed in the conversation window configured to show the exchanged conversation messages of the conversation group in the messaging application on a terminal of one of the members, or displayed near an identifier of the conversation group in a list of conversation groups in the messaging application on the terminal of the one of the members.

5. The method of claim 1, further comprising:
in response to determining that the target conversation message does not include a first image,
determining, by the server, that the target conversation message includes a second text;
acquiring, by the server, a release time of a recent image released in the conversation group; and
in response to determining that the release time of the recent image is within the preset scope, storing, by the server, the second text in the shared album as a comment on the recent image.

6. An image-sharing method, comprising:
acquiring, by a terminal, a target conversation message to a conversation group from a current user of a messaging application on the terminal based on input of the current user, the target conversation message including at least one of a first image or a first text, the target conversation message being entered to a conversation window of the messaging application, the conversation window being configured to display conversation messages exchanged among multiple members of the conversation group, the conversation group being an instant messaging conversation group;
sending, by the terminal, to a server a conversation-processing request of releasing the target conversation message to the conversation group, such that the server forwards the target conversation message to members of the conversation group and updates a shared album corresponding to the conversation group according to a content of the target conversation message;
after sending the conversation-processing request to the server and in response to the target conversation message including the first image, receiving, by the terminal, a storage prompt from the server, the storage prompt indicating that the first image is stored in the shared album, wherein the storage prompt is displayed within the messaging application;
after sending the conversation-processing request to the server, displaying, by the terminal, the shared album corresponding to the conversation group, comprising:
in response to the target conversation message including a first image without a first text, displaying the first image in the shared album corresponding to the conversation group; and in response to the target conversation message including both a first image and a first text, displaying the first image in the shared album corresponding to the conversation group, together with the first text as a comment from the current user on the first image:
receiving, by the terminal an access message of the first image, and displaying, near the first image in the conversation window, an access option for accessing the shared album to view the first image based on the access message, wherein the access message includes a storage path of the first image for viewing the first image; and
in response to a selection of the access option, displaying by the terminal, the first image of the shared album according to the storage patch included in the access message.

7. The method of claim 6, further comprising: sending, by the terminal, a view request of the shared album corresponding to the conversation group to the server;
receiving, by the terminal, an image list of the shared album from the server; and
displaying, by the terminal, the shared album according to the image list.

8. The method of claim 7, wherein:
the image list includes the first image and one or more second images released by one or more members of the conversation group, and
displaying the shared album comprises: displaying, by the terminal, the shared album according to release times of the first image and the second images.

9. The method of claim 6 further comprising at least one of:
displaying the storage prompt in the conversation window of the messaging application;
or displaying the storage prompt near an identifier of the conversation group in a list of conversation groups shown in the messaging application.

10. The method of claim 6, wherein after sending the conversation-processing request to the server, displaying the shared album further comprises:
in response to the target conversation message including a first text without a first image, and in response to a release time of a second image being within a preset scope, displaying the first text as a comment of the current user on the second image in the shared album corresponding to the conversation group.

11. An image-sharing device, comprising: a memory; and a processor coupled to the memory configured to perform:
acquiring a target conversation message to a conversation group from a current user of a messaging application on the image-sharing device based on input of the current user, the target conversation message including at least one of a first image or a first text, the target conversation message being entered to a conversation window of the messaging application, the conversation window being configured to display conversation messages exchanged among multiple members of the conversation group, the conversation group being an instant messaging conversation group;
sending to a server a conversation-processing request of releasing the target conversation message to the conversation group, such that the server forwards the target conversation message to members of the conversation group and updates a shared album corresponding to the conversation group according to a content of the target conversation message;
after sending the conversation-processing request to the server and in response to the target conversation message including the first image, receiving a storage prompt from the server, the storage prompt indicating that the first image is stored in the shared album, wherein the storage prompt is displayed within the messaging application;
after sending the conversation-processing request to the server, displaying the shared album corresponding to the conversation group, comprising:
in response to the target conversation message including a first image without a first text,
displaying the first image in the shared album corresponding to the conversation group;
in response to the target conversation message including both a first image and a first text,
displaying the first image in the shared album corresponding to the conversation group, together with the first text as a comment from the current user on the first image:
receiving, by the terminal an access message of the first image, and displaying, near the first image in the conversation window, an access option for accessing the shared album to view the first image based on the access message, wherein the access message includes a storage path of the first image for viewing the first image; and
in response to a selection of the access option, displaying by the terminal, the first image of the shared album according to the storage path included in the access message.

12. The device of claim 7, wherein the processor is further configured to perform:
sending a view request of the shared album corresponding to the conversation group to the server;
receiving an image list of the shared album from the server; and
displaying the shared album according to the image list.

13. The device of claim 12, wherein:
the image list includes the first image and one or more second images released by one or more members of the conversation group, and
displaying the shared album comprises: displaying the shared album according to release times of the first image and the second images.

14. The device of claim 12, wherein displaying the shared album comprises:
displaying one or more comments corresponding to an image in the image list.

15. The device of claim 11, wherein the processor is further configured to perform at least one of:
displaying the storage prompt in the conversation window of the messaging application; or displaying the storage prompt near an identifier of the conversation group in a list of conversation groups shown in the messaging application.

16. The device of claim 7, wherein after sending the conversation processing request to the server, displaying the shared album further comprises:
in response to the target conversation message including a first text without a first image, and in response to a release time of a second image being within a preset scope, displaying the first text as a comment of the current user on the second image in the shared album corresponding to the conversation group.

* * * * *